(12) United States Patent
Bales

(10) Patent No.: US 11,137,046 B2
(45) Date of Patent: Oct. 5, 2021

(54) TUNED ABSORBER ASSEMBLY

(71) Applicant: Steering Solutions IP Holding Corporation, Saginaw, MI (US)

(72) Inventor: Gregory M. Bales, Hemlock, MI (US)

(73) Assignee: Steering Solutions IP Holding Corporation, Saginaw, MI (US)

(*) Notice: Subject to any disclaimer, the term of this patent is extended or adjusted under 35 U.S.C. 154(b) by 275 days.

(21) Appl. No.: 15/868,338

(22) Filed: Jan. 11, 2018

(65) Prior Publication Data
US 2019/0211899 A1 Jul. 11, 2019

(51) Int. Cl.
*F16F 15/32* (2006.01)
*F16C 3/02* (2006.01)
*F16F 15/34* (2006.01)

(52) U.S. Cl.
CPC ............. *F16F 15/322* (2013.01); *F16C 3/02* (2013.01); *F16F 15/34* (2013.01); *Y10T 464/50* (2015.01)

(58) Field of Classification Search
CPC . F16F 15/322; F16F 15/34; F16C 3/02; Y10T 454/50
USPC .................. 464/180; 188/379, 380
See application file for complete search history.

(56) References Cited

U.S. PATENT DOCUMENTS

| | | | |
|---|---|---|---|
| 5,884,902 A | 3/1999 | Hamada et al. | |
| 6,883,653 B2 * | 4/2005 | Kato | F16F 15/1442 464/180 |
| 2008/0176663 A1 | 7/2008 | Hatanaka et al. | |

FOREIGN PATENT DOCUMENTS

| | | |
|---|---|---|
| JP | 2012233523 A | 11/2012 |
| WO | 2011148007 A1 | 12/2011 |

* cited by examiner

*Primary Examiner* — Greg Binda
(74) *Attorney, Agent, or Firm* — Dickinson Wright PLLC

(57) ABSTRACT

A drive shaft assembly includes an elongate member and a tuned absorber assembly. The elongate member has an exterior surface that is disposed about an axis. The tuned absorber assembly includes a mass and a sleeve. The mass is at least partially disposed about the exterior surface. The sleeve extends between a first sleeve end and a second sleeve end. The sleeve is disposed about the mass and spaces the mass apart from the exterior surface of the elongate member.

10 Claims, 1 Drawing Sheet

TUNED ABSORBER ASSEMBLY

BACKGROUND OF THE INVENTION

Drivetrain systems generally include a shaft or rotational member that is used to transfer power from a power source to a driven mechanism. The shaft of a rotational member may transmit and/or amplify noise or vibrations that are encountered or excited during operation. Some drivetrain systems are provided with a single mass or a single spring absorber to counteract the noise or vibrations.

SUMMARY OF THE INVENTION

According to an embodiment of the present disclosure, a drive shaft assembly is provided. The drive shaft assembly includes an elongate member and a tuned absorber assembly. The elongate member has an exterior surface that is disposed about an axis. The tuned absorber assembly includes a mass and a sleeve. The mass is at least partially disposed about the exterior surface. The sleeve extends between a first sleeve end and a second sleeve end. The sleeve is disposed about the mass and spaces the mass apart from the exterior surface of the elongate member.

In addition to one or more of the features described herein, the sleeve defines a first functional area that extends between the first sleeve end and the mass and a second functional area that extends between the second sleeve end and the mass.

In addition to one or more of the features described herein, the first functional has a first thickness and the second functional area has a second thickness.

In addition to one or more of the features described herein, the second thickness is different than the first thickness.

According to another embodiment of the present disclosure, a drive shaft assembly is provided. The drive shaft assembly includes an elongate member and a tuned absorber assembly. The elongate member has an exterior surface. The tuned absorber assembly includes a sleeve that axially extends between a first sleeve end and a second sleeve end and radially extends between an interior sleeve surface and an exterior sleeve surface. The sleeve defines a pocket, a first functional area, and a second functional area. The pocket is disposed between the interior sleeve surface and the exterior sleeve surface. The first functional area has a first spring rate and extends between the pocket and a first sleeve end. The second functional area has a second spring rate and extends between the pocket and a second sleeve end. The second spring rate is different than the first spring rate.

According to yet another embodiment of the present disclosure, a tuned absorber assembly for a drive shaft is provided. The tuned absorber assembly includes a sleeve that axially extends between a first sleeve end and a second sleeve end and extends radially between an interior sleeve surface and an exterior sleeve surface. The sleeve defines a pocket and a recess that extends from the interior sleeve surface towards the exterior surface sleeve. The tuned absorber assembly further includes a mass that is received within the pocket.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, it is to be understood that the disclosed embodiments are merely illustrative of the invention that is embodied in various and alternative forms. The figures are not necessarily to scale; some features are exaggerated or minimized to show details of particular components. Therefore, specific structural and functional details disclosed herein are not to be interpreted as limiting, but merely as a representative basis for teaching one skilled in the art to variously employ the present invention.

Figure 1:
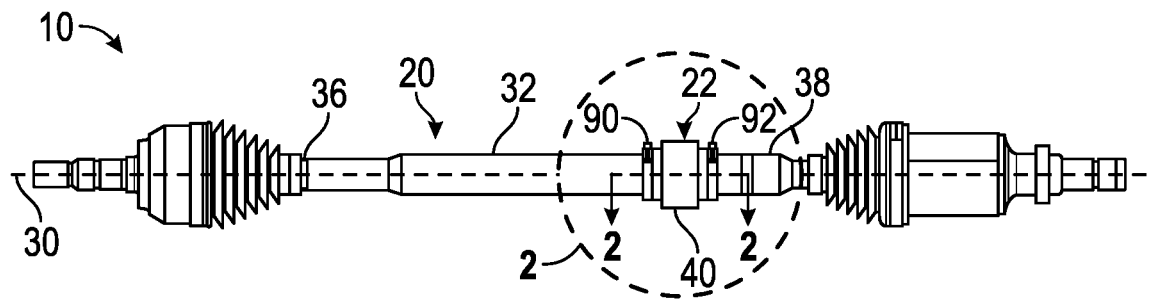
FIG. 1 is a perspective view of a drive shaft assembly having a tuned absorber assembly.

Referring to FIG. 1 a drive shaft assembly 10 is shown. The drive shaft assembly 10 is provided as part of a drivetrain system and is arranged to transmit rotational power from one component to another component. The drive shaft assembly 10 includes an elongate member 20 and a tuned absorber assembly 22.

The elongate member 20 extends along an axis 30. The elongate member 20 has an exterior surface 32 that is disposed about the axis 30 and extends between a first end 36 and a second end 38 of the elongate member 20 along the axis 30.

The tuned absorber assembly 22 is disposed about the elongate member 20. The tuned absorber assembly 22 is configured as a single mass dual frequency damper.

Figure 2:
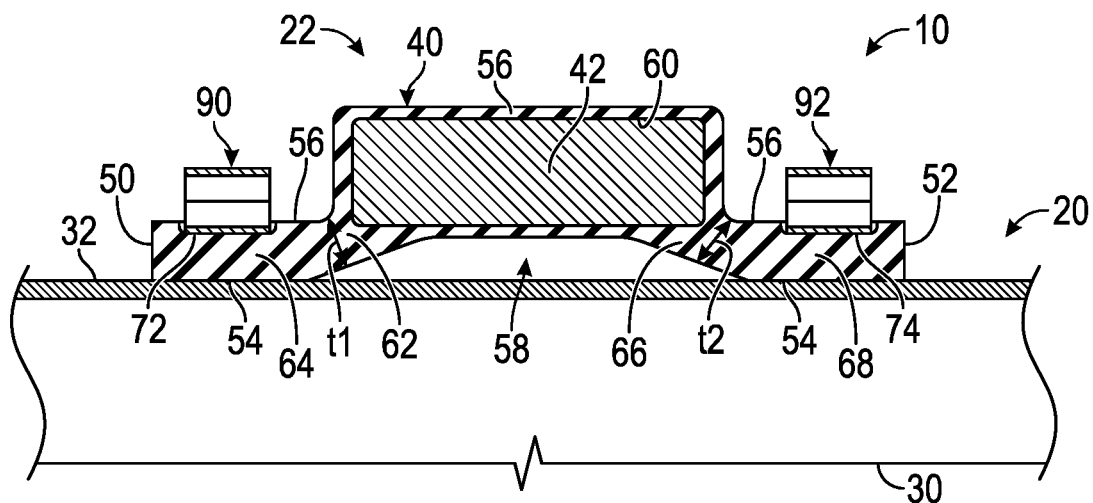
FIG. 2 is a partial section view of the tuned absorber assembly.

Referring to FIG. 2, the tuned absorber assembly 22 includes a sleeve 40 and a mass 42. The sleeve 40 extends about the exterior surface 32 of the elongate member 20 and spaces the mass 42 apart from the exterior surface 32.

The sleeve 40 is configured as a molded diaphragm that is made of a rubber, a plastic, or the like. The sleeve 40 has a generally tubular or cylindrical shape having an unequal stiffness or unequal spring rate on each end.

The sleeve 40 axially extends between a first sleeve end 50 and a second sleeve end 52, relative to the axis 30. The second sleeve end 52 is disposed opposite the first sleeve end 50. The sleeve 40 radially extends between an interior sleeve surface 54 and an exterior sleeve surface 56, relative to the axis 30.

The sleeve 40 defines a recess 58 and a pocket 60. The recess 58 extends from the interior sleeve surface 54 towards the pocket 60 and the exterior sleeve surface 56. The interior sleeve surface 54 proximate the first sleeve end 50 engages the exterior surface 32 of the elongate member 20. The interior sleeve surface 54 proximate the second sleeve end 52 engages the exterior surface 32 of the elongate member 20. The interior sleeve surface 54 proximate the pocket 60 is spaced apart from the exterior surface of the elongate member 20 by the recess 58.

The pocket 60 is radially disposed between the interior sleeve surface 54 and the exterior sleeve surface 56. The pocket 60 is spaced apart from the exterior surface 32 of the elongate member 20 by the recess 58.

The sleeve 40 defines a first functional area 62, a first sleeve neck 64, a second functional area 66, and a second sleeve neck 68. The pocket 60 is radially disposed between the interior sleeve surface 54 and the exterior sleeve surface 56 and is axially disposed between the first functional area 62 and the second functional area 66.

The first functional area 62 extends between the pocket 60 and the first sleeve neck 64. The first sleeve neck 64 is disposed between the first functional area 62 and the first sleeve end 50.

The first functional area 62 has a first stiffness and/or a first spring rate that is provided by a first thickness, t1. The first thickness, t1, of the first functional area 62 may be varied to vary the first stiffness and/or the first spring rate.

The first sleeve neck 64 extends between the first functional area 62 towards the first sleeve end 50. The interior sleeve surface 56 proximate the first sleeve neck 64 is configured to engage the exterior surface 32 of the elongate member 20. The first sleeve neck 64 defines a first receiving recess 72 that extends from the exterior sleeve surface 56 towards the interior sleeve surface 54.

The second functional area 66 is disposed opposite the first functional area 62. The second functional area 66 extends between the pocket 60 and the second sleeve neck 68. The second sleeve neck 68 is disposed between the second functional area 66 and the second sleeve end 52.

The second functional area 66 has a second stiffness and/or a second spring rate that is provided by a second thickness, t2. The second thickness, t2, of the second functional area 66 may be varied to vary the second stiffness and/or the second spring rate. The second thickness, t2, is different than the first thickness, t1, such that the first stiffness and/or the first spring rate is different than the second stiffness and/or the second spring rate. The differences between the first stiffness and/or the first spring rate of the first functional area 62 and the second stiffness and or the second spring rate of the second functional area 66 provides the tuned absorber assembly 22 with two unique frequencies or two unique stiffnesses to damp vibrations or oscillations of the elongate member 20 of the drive shaft assembly 10.

The second sleeve neck 68 extends between the second functional area 66 and the second sleeve end 52. The interior sleeve surface 56 proximate the second sleeve neck 66 is configured to engage the exterior surface 32 of the elongate member 20. The second sleeve neck 68 defines a second receiving recess 74 that extends from the exterior sleeve surface 56 towards the interior sleeve surface 54.

The mass 42 is at least partially disposed about the exterior surface 32 of the elongate member 20. The mass 42 may be a ring of mass that is molded into the sleeve 40. The sleeve 40 and the mass 42 are arranged such that the mass 42 is spaced apart from and does not engage the exterior surface 32 or the mounting portion 34 of the elongate member 20 by the recess 58.

The mass 42 may be selected based on a mass of the elongate member 20. The first thickness, t1, of the first functional area 62 and the second thickness, t2, of the second functional area 66 may be selected based on the mass 42, the mass of the elongate member 20, and the frequency and/or amplitude to be damped.

The mass 42 is at least partially received within the pocket 60 of the sleeve 40. The pocket 60 facilitates the suspending or spacing apart the mass 42 from the exterior surface 32 of the elongate member 20 such that the recess 58 is disposed between the mass 42 and exterior surface 32 of the elongate member 20.

A first clamp 90 and a second clamp 92 are provided to operatively connect to the tuned absorber assembly 22 to the elongate member 20. The first clamp 90 is disposed about the first sleeve neck 64 and is received within the first receiving recess 72. The first clamp 90 is disposed between the first sleeve end 50 and the first functional area 62. The second clamp 92 is disposed about the second sleeve neck 68 and is received within the second receiving recess 74. The second clamp 92 is disposed between the second sleeve end 52 and the second functional area 66.

The tuned absorber assembly 22 having a suspended mass 42 and a first functional area 62 providing a first stiffness and/or a first spring rate and a second functional area 66 providing a second stiffness and/or a second spring rate that is different from the first stiffness and/or the first spring rate expands the range of frequency damping of the tuned absorber assembly 22. The arrangement of the tuned absorber assembly 22 flattens out the frequency response of the drive shaft assembly 10. Furthermore, the arrangement of the tuned absorber assembly 22 facilitates the usage of nearly all of the mass 42 at each frequency.

Throughout this specification, the term "attach," "attachment," "connected", "coupled," "coupling," "mount," or "mounting" shall be interpreted to mean that a structural component or element is in some manner connected to or contacts another element, either directly or indirectly through at least one intervening structural element, or is integrally formed with the other structural element.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with scope of the invention. Additionally, while various embodiments of the invention have been described, it is to be understood that aspects of the invention may include only some of the described embodiments. Accordingly, the invention is not to be seen as limited by the foregoing description.

The invention claimed is:

1. A drive shaft assembly, comprising:
   an elongate member having an exterior surface that is disposed about an axis; and
   a tuned absorber assembly, comprising:
   a single mass at least partially disposed about the exterior surface;
   a sleeve extending axially between a first sleeve end and a second sleeve end and radially extending between an interior sleeve surface and an exterior sleeve surface, the sleeve defining a pocket for receiving the mass and a recess for spacing the mass apart from the exterior surface of the elongate member;
   a first sleeve neck extending from the first sleeve end and a first functional area extending between the first sleeve neck and the pocket;
   a second sleeve neck extending from the second sleeve end and a second functional area extending between the second sleeve neck and the pocket;
   wherein the interior sleeve surface engages the exterior surface of the elongate member along the first sleeve neck and the first functional area extends at a first thickness towards the pocket to define a first spring rate to move the mass on a first frequency;
   wherein the interior sleeve surface engages the exterior surface of the elongate member along the second sleeve neck and the second functional area extends at a second thickness toward the pocket to define a second spring rate to move the mass on a second frequency, the first frequency and the second frequency being different; and a first clamp that is disposed about the first sleeve neck that extends between the first sleeve end and the first functional area to operatively connect the tuned absorber assembly to the elongate member.

2. The drive shaft assembly of claim 1, wherein the second spring rate different than the first spring rate.

3. The drive shaft assembly of claim 1, further comprising a second clamp that is disposed about the second sleeve neck that extends between the second sleeve end and the second functional area to operatively connect the tuned absorber assembly to the elongate member.

4. A drive shaft assembly, comprising:
an elongate member having an exterior surface; and
a tuned absorber assembly, comprising:
a sleeve axially extending between a first sleeve end and a second sleeve end and radially extending between an interior sleeve surface and an exterior sleeve surface, the sleeve defining:
a pocket that is disposed between the interior sleeve surface and the exterior sleeve surface;
a single mass received within the pocket;
a first sleeve neck extending from the first sleeve end and a first functional area extending between the first sleeve neck and the pocket, the first functional area having a first spring rate;
a second sleeve neck extending from the second sleeve end and a second functional area extending between the second sleeve neck and the pocket, the second functional area having a second spring rate, the second spring rate being different than the first spring rate;
wherein the interior sleeve surface engages the exterior surface of the elongate member along the first sleeve neck and the first functional area extends at a first thickness towards the pocket to define a first spring rate to move the mass on a first frequency;
wherein the interior sleeve surface engages the exterior surface of the elongate member along the second sleeve neck and the second functional area extends at a second thickness towards the pocket to define a second spring rate to move the mass on a second frequency, the first frequency and the second frequency being different; and
a first clamp that is disposed about the first sleeve neck that extends between the first sleeve end and the first functional area to operatively connect the tuned absorber assembly to the elongate member.

5. The drive shaft assembly of claim 4, wherein the sleeve defines a recess that radially extends from the interior sleeve surface towards the pocket.

6. The drive shaft assembly of claim 5, wherein the recess spaces the interior sleeve surface proximate the pocket apart from the exterior surface.

7. The drive shaft assembly of claim 6, wherein the first functional area and the second functional area are spaced apart from the exterior surface.

8. A tuned absorber assembly for a drive shaft, the tuned absorber assembly comprising:
a sleeve extending axially between a first sleeve end and a second sleeve end and extends radially between an interior sleeve surface and an exterior sleeve surface, the sleeve defining:
a pocket;
a recess that extends from the interior sleeve surface towards the exterior sleeve surface;
a single mass received within the pocket;
a first sleeve neck extending from the first sleeve end and a first functional area extending between the first sleeve neck and the pocket;
a second sleeve neck extending from the second sleeve end and a second functional area extending between the second sleeve neck and the pocket;
wherein the interior sleeve surface is shaped for engagement with the exterior surface of a provided elongate member along the first sleeve neck and the first functional area extends at a first thickness towards the pocket to define a first spring rate to move the mass on a first frequency;
wherein the interior sleeve surface is shaped for engagement with the exterior surface of the provided elongate member along the second sleeve neck and the second functional area extends at a second thickness towards the pocket to define a second spring rate to move the mass on a second frequency, the first frequency and second frequency being different; and
wherein the first sleeve neck defines a first receiving recess that extends from an exterior sleeve surface towards the interior sleeve surface for receiving a first clamp.

9. The tuned absorber assembly of claim 8, wherein the second spring rate different than the first spring rate.

10. The tuned absorber assembly of claim 8, wherein the second sleeve neck defines a second receiving recess that extends from an exterior sleeve surface towards the interior sleeve surface for receiving a second clamp.

* * * * *